United States Patent
Nakamura

(10) Patent No.: US 10,552,100 B2
(45) Date of Patent: Feb. 4, 2020

(54) INFORMATION PROCESSING APPARATUS THAT EXECUTES A PRINTER DRIVER FOR MERGING ADDRESS BOOKS, INFORMATION PROCESSING METHOD, AND NON-TRANSITORY RECORDING MEDIUM

(71) Applicant: Aoi Nakamura, Kanagawa (JP)

(72) Inventor: Aoi Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/249,972

(22) Filed: Jan. 17, 2019

(65) Prior Publication Data
US 2019/0286389 A1    Sep. 19, 2019

(30) Foreign Application Priority Data
Mar. 16, 2018  (JP) ................................. 2018-050094

(51) Int. Cl.
    *G06F 3/12*    (2006.01)
(52) U.S. Cl.
    CPC .......... *G06F 3/1225* (2013.01); *G06F 3/1205* (2013.01); *G06F 3/1288* (2013.01)
(58) Field of Classification Search
    None
    See application file for complete search history.

(56) References Cited

U.S. PATENT DOCUMENTS

| 7,116,657 B1* | 10/2006 | Lang ..................... H04M 7/003 370/356 |
| 8,005,897 B1* | 8/2011 | Roka ..................... G06Q 10/10 709/205 |
| 2003/0236842 A1* | 12/2003 | Natarajan ............... H04L 51/28 709/206 |
| 2004/0085947 A1* | 5/2004 | Ekberg .................. H04W 48/16 370/349 |

(Continued)

FOREIGN PATENT DOCUMENTS

| JP | 2013101538 A  * | 5/2013 |
| JP | 2017-175229 | 9/2017 |

OTHER PUBLICATIONS

Sato, Masato, JP Publication No. 2013101538-A (JP Application No. 2011-245460) English Translation, Server Device and Program Thereof, Abstract, par 0019-0025 (Year: 2013).*

*Primary Examiner* — Miya J Williams
(74) *Attorney, Agent, or Firm* — Oblon, McClelland, Maier & Neustadt, L.L.P.

(57) ABSTRACT

An information processing apparatus executes a printer driver, and includes processing circuitry and one or more memories. The processing circuitry is configured to display a first setting screen and a second setting screen. The first setting screen is used to perform setting of the printer driver via a desktop application. The second setting screen is used to perform setting of the printer driver via a store application. The memories include a first memory area and a second memory area. The first memory area is editable on the first setting screen, and stores a first address book editable by the (Continued)

processing circuitry. The second memory area editable on the second setting screen, and stores a second address book editable by the processing circuitry. The processing circuitry is configured to merge the first address book and the second address book.

17 Claims, 15 Drawing Sheets

(56) References Cited

U.S. PATENT DOCUMENTS

| | | | |
|---|---|---|---|
| 2006/0085373 A1* | 4/2006 | Dhillion | G06Q 30/02 |
| 2014/0066044 A1* | 3/2014 | Ramnani | H04W 8/24 |
| | | | 455/418 |
| 2015/0178020 A1* | 6/2015 | Suzuki | G06F 3/1204 |
| | | | 358/1.15 |
| 2018/0088883 A1* | 3/2018 | Hashimoto | B41J 3/46 |

* cited by examiner

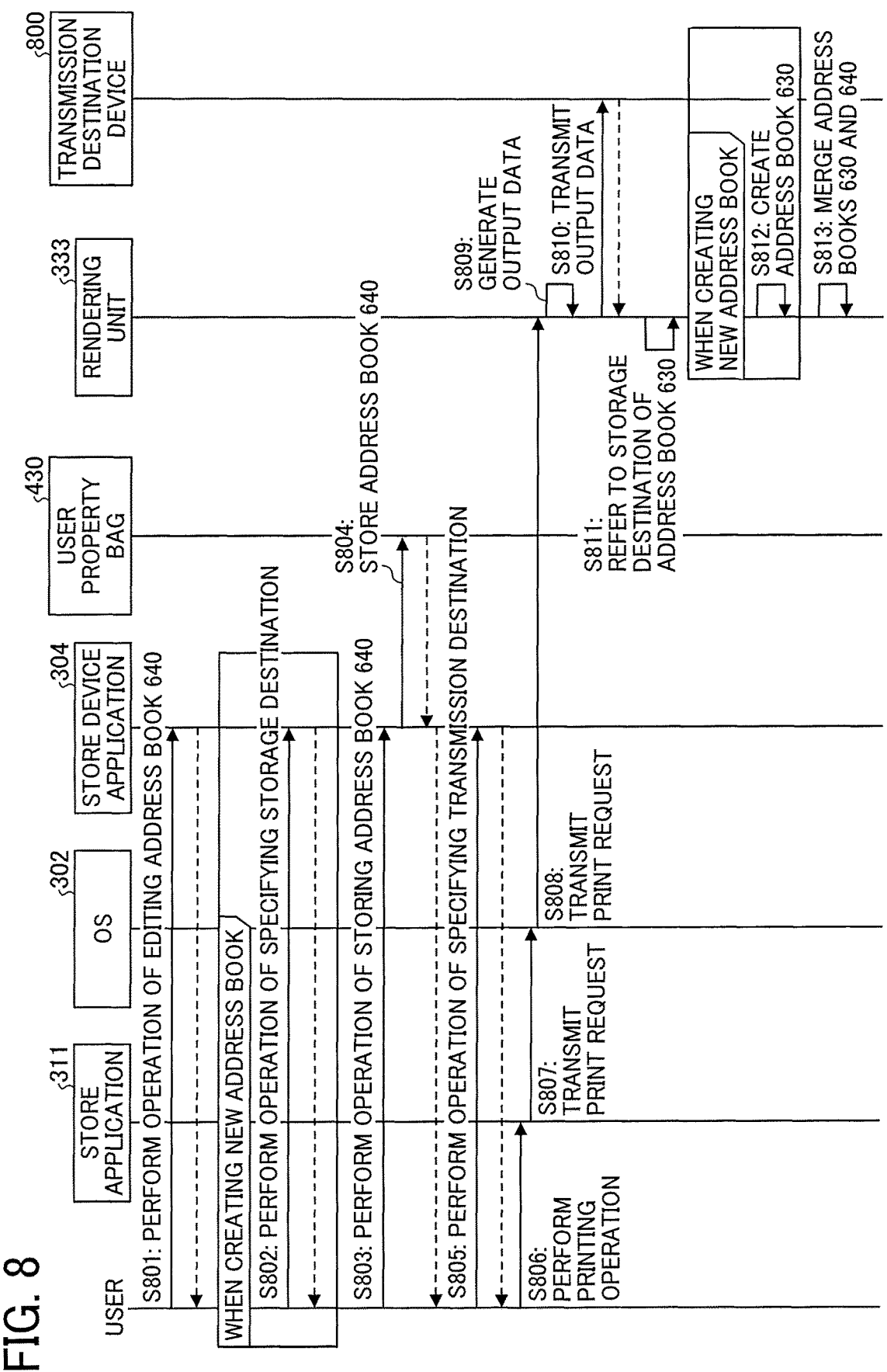

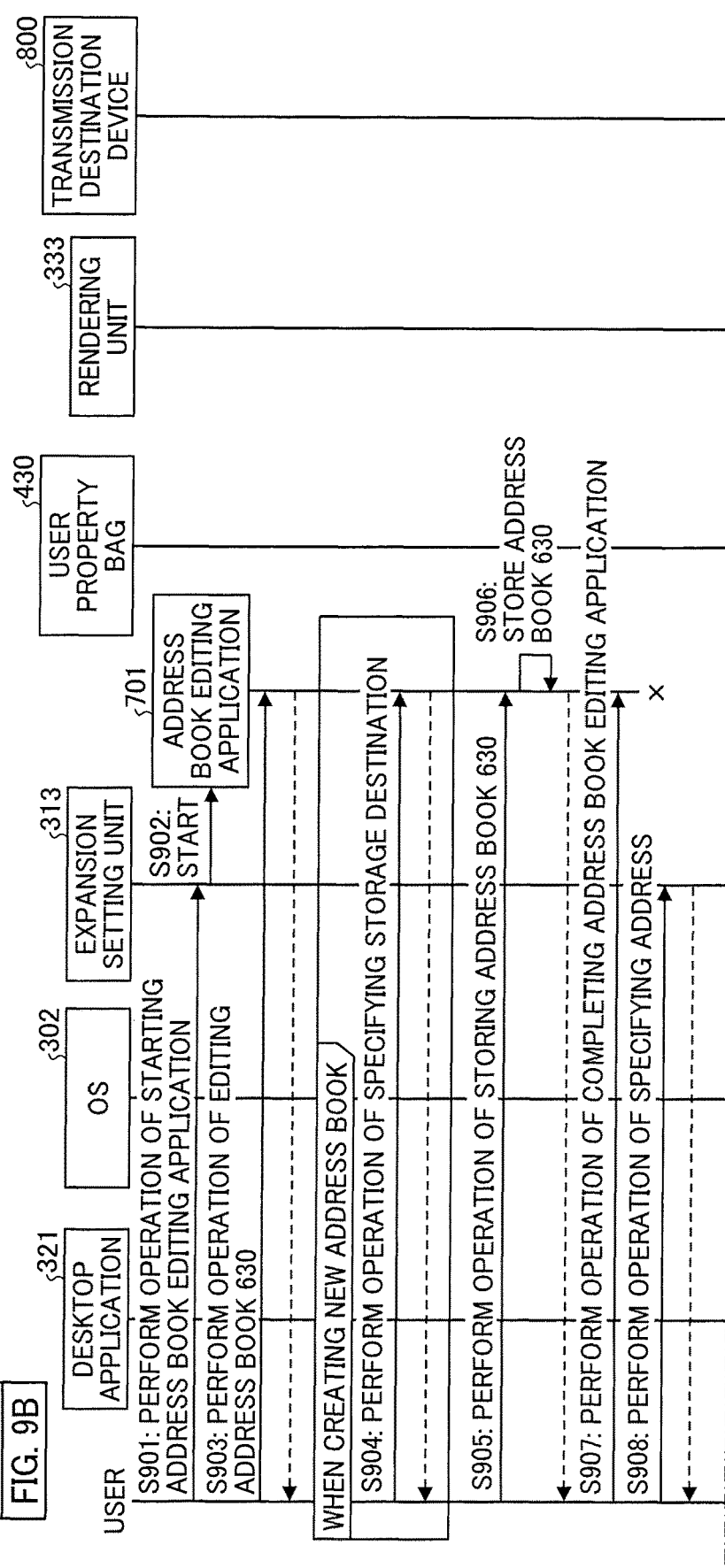

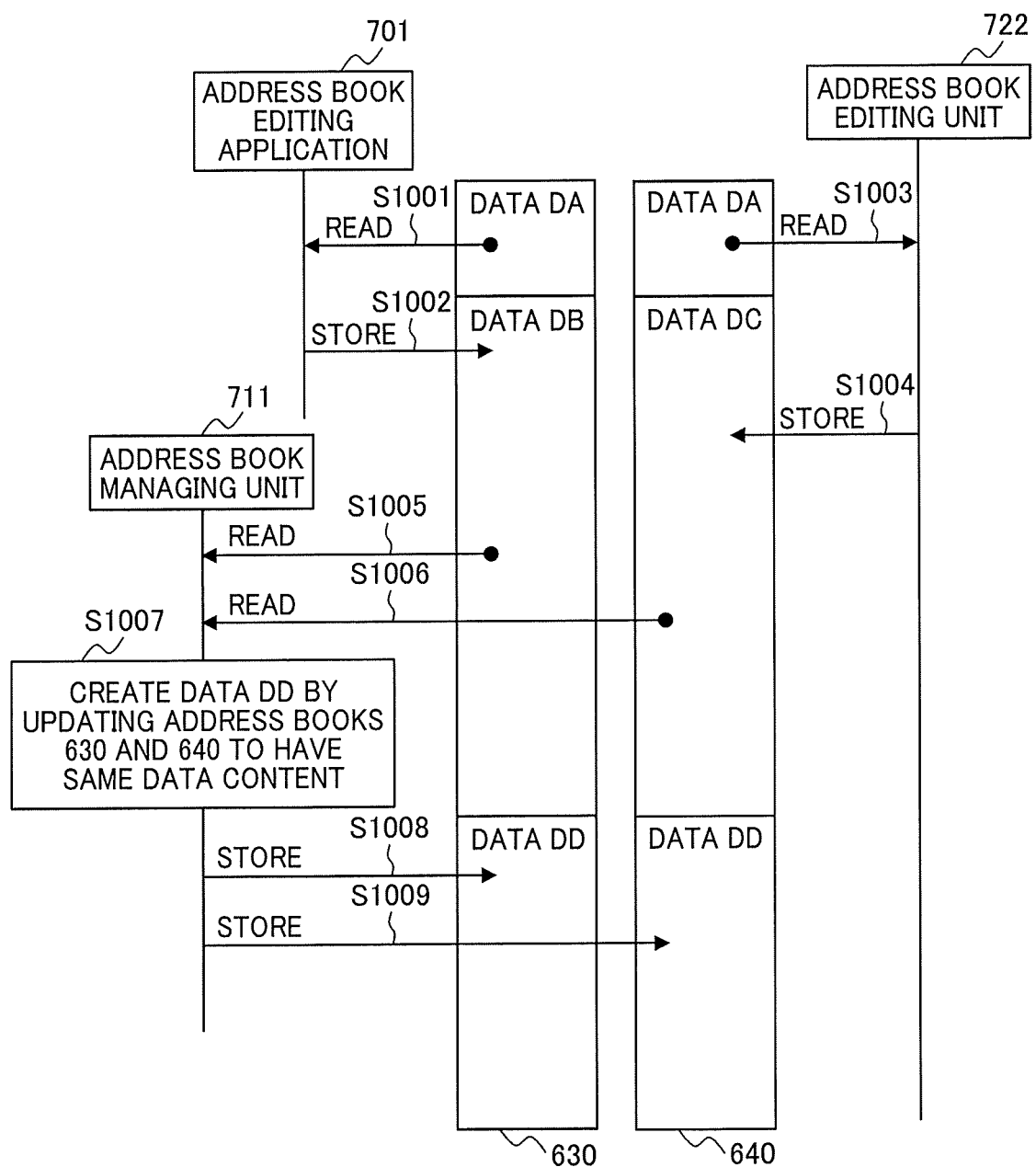

FIG. 11A

DATA DA (STORAGE TIME 12:00)

| NUMBER | NAME | TRANSMISSION DESTINATION INFORMATION | UPDATE | ... |
|---|---|---|---|---|
| 1 | USER A | 111-111-1111 | 0 | ... |
| 2 | USER B | 222-222-2222 | 0 | ... |
| 3 | USER C | 333-333-3333 | 0 | ... |
| ... | ... | ... | ... | ... |

DATA DB (STORAGE TIME 12:02)

| NUMBER | NAME | TRANSMISSION DESTINATION INFORMATION | UPDATE | ... |
|---|---|---|---|---|
| 1 | USER A | 111-111-1114 | 1 | ... |
| 2 | USER B | 222-222-2225 | 1 | ... |
| 3 | USER C | 333-333-3333 | 0 | ... |
| ... | ... | ... | ... | ... |

DATA DC (STORAGE TIME 12:04)

| NUMBER | NAME | TRANSMISSION DESTINATION INFORMATION | UPDATE | ... |
|---|---|---|---|---|
| 1 | USER A | 111-111-1111 | 0 | ... |
| 2 | USER B | 222-222-2226 | 1 | ... |
| 3 | USER C | 333-333-3337 | 1 | ... |
| ... | ... | ... | ... | ... |

DATA DD (STORAGE TIME 12:06)

| NUMBER | NAME | TRANSMISSION DESTINATION INFORMATION | UPDATE | ... |
|---|---|---|---|---|
| 1 | USER A | 111-111-1114 | 0 | ... |
| 2 | USER B | 222-222-2226 | 0 | ... |
| 3 | USER C | 333-333-3337 | 0 | ... |
| ... | ... | ... | ... | ... |

FIG. 11B

DATA DA

| NUMBER | NAME | TRANSMISSION DESTINATION INFORMATION | STORAGE TIME | ... |
|---|---|---|---|---|
| 1 | USER A | 111-111-1111 | – | ... |
| 2 | USER B | 222-222-2222 | – | ... |
| 3 | USER C | 333-333-3333 | – | ... |
| ... | ... | ... | ... | ... |

DATA DB

| NUMBER | NAME | TRANSMISSION DESTINATION INFORMATION | STORAGE TIME | ... |
|---|---|---|---|---|
| 1 | USER A | 111-111-1114 | 12:01 | ... |
| 2 | USER B | 222-222-2225 | 12:02 | ... |
| 3 | USER C | 333-333-3333 | – | ... |
| ... | ... | ... | ... | ... |

DATA DC

| NUMBER | NAME | TRANSMISSION DESTINATION INFORMATION | STORAGE TIME | ... |
|---|---|---|---|---|
| 1 | USER A | 111-111-1111 | – | ... |
| 2 | USER B | 222-222-2226 | 12:03 | ... |
| 3 | USER C | 333-333-3337 | 12:04 | ... |
| ... | ... | ... | ... | ... |

DATA DD

| NUMBER | NAME | TRANSMISSION DESTINATION INFORMATION | STORAGE TIME | ... |
|---|---|---|---|---|
| 1 | USER A | 111-111-1114 | – | ... |
| 2 | USER B | 222-222-2226 | – | ... |
| 3 | USER C | 333-333-3337 | – | ... |
| ... | ... | ... | ... | ... |

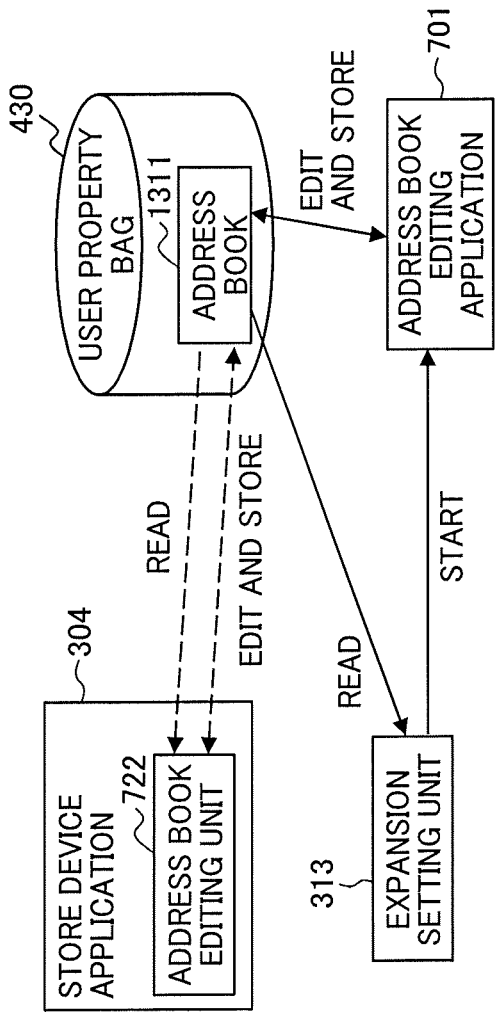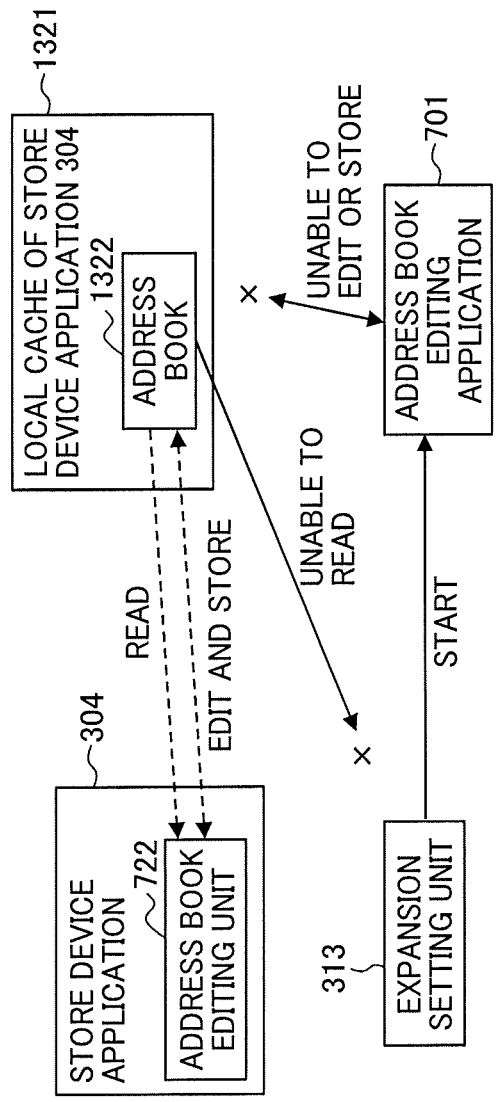
FIG. 13A
RELATED ART
FIG. 13B
RELATED ART

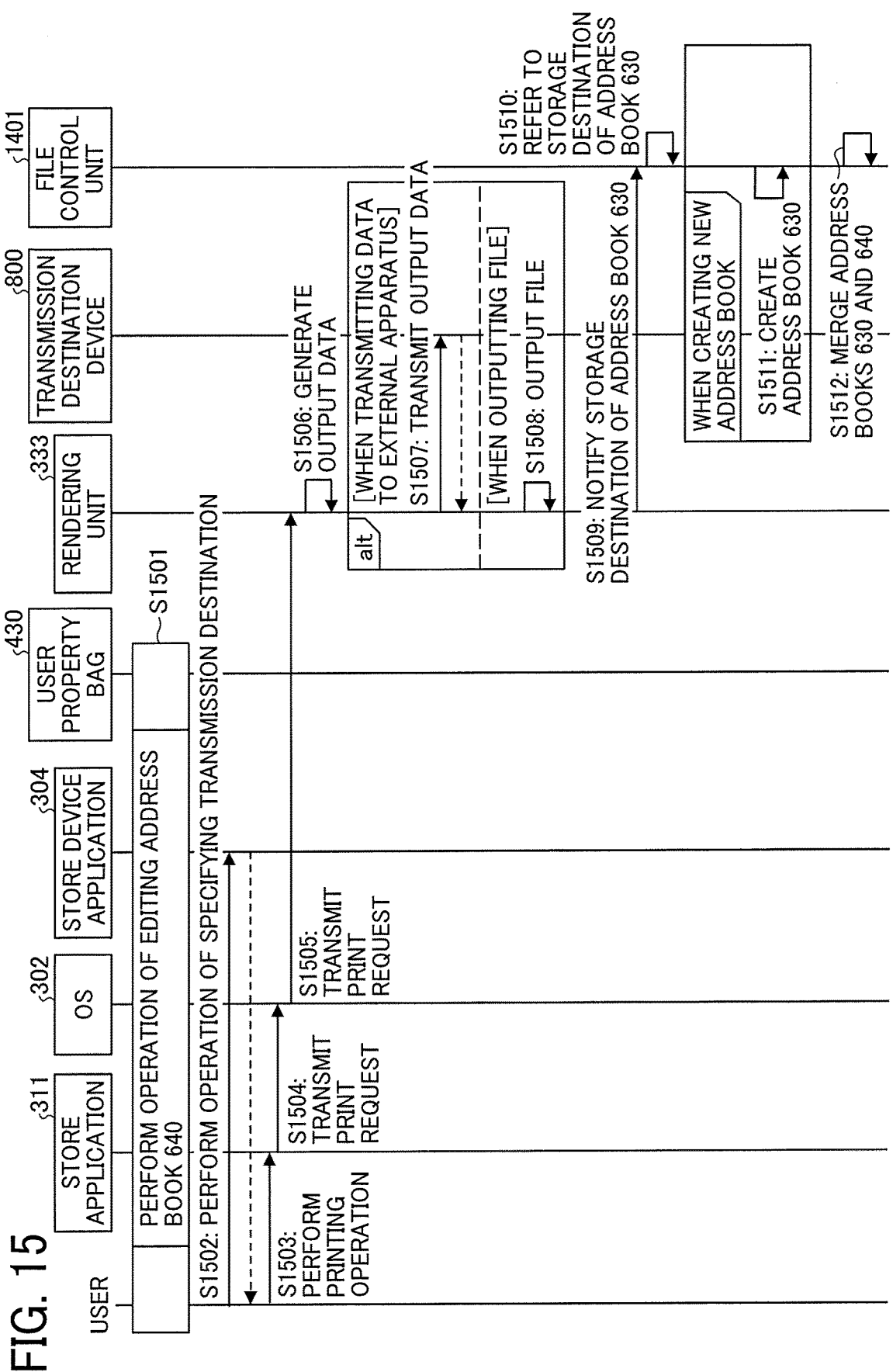

INFORMATION PROCESSING APPARATUS THAT EXECUTES A PRINTER DRIVER FOR MERGING ADDRESS BOOKS, INFORMATION PROCESSING METHOD, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2018-050094 filed on Mar. 16, 2018, in the Japan Patent Office, the entire disclosure of which is hereby incorporated by reference herein.

BACKGROUND

Technical Field

The present disclosure relates to an information processing apparatus, an information processing method, and a non-transitory recording medium.

Description of the Related Art

A Windows (registered trademark) operating system (OS) with one of versions Windows 2000 to Windows 7 adopts an architecture of the printer driver called Version 3 (hereinafter referred to as V3) printer driver. A Windows OS with Windows 8 or a version thereafter adopts a new architecture of the printer driver called Version 4 (hereinafter referred to as V4) printer driver, in addition to the V3 printer driver.

According to an existing technique for a facsimile transmitter, address book information attached to facsimile job data is compared with address book information held by the facsimile transmitter, and if there is a difference between the two types of address book information, a transmission destination is corrected.

On a Windows OS with Windows 8 or a version thereafter, it is possible to use a store application available from Windows Store, which provides applications to the Windows OS, in addition to a previously existing desktop application.

To perform print settings via such a store application, a store device application is used to display a setting screen for the store application. The store device application is also available from Windows Store similarly to the store application.

Owing to enhanced security, however, the store application and the store device application are more limited in access to a file or registry in an information processing apparatus than the desktop application is. According to the existing technique, therefore, it is difficult to edit, on the setting screen for the store application provided by the V4 printer driver, an address book stored in a local folder in a storage device of the information processing apparatus, for example.

SUMMARY

In one embodiment of this invention, there is provided an improved information processing apparatus that executes a printer driver and includes, for example, processing circuitry and one or more memories. The processing circuitry is configured to display a first setting screen and a second setting screen. The first setting screen is used to perform setting of the printer driver via a desktop application. The second setting screen is used to perform setting of the printer driver via a store application. The memories include a first memory area and a second memory area. The first memory area is editable on the first setting screen, and stores a first address book editable by the processing circuitry. The second memory area editable on the second setting screen, and stores a second address book editable by the processing circuitry. The processing circuitry is configured to merge the first address book and the second address book.

In one embodiment of this invention, there is provided an improved information processing method performed by an information processing apparatus that executes a printer driver. The information processing method includes, for example, storing a first address book in a first memory area editable on a first setting screen that is used to perform setting of the printer driver via a desktop application, editing a second address book stored in a second memory area editable on a second setting screen that is used to perform setting of the printer driver via a store application, and merging the first address book and the second address book, respectively read from the first memory area and the second memory area.

In one embodiment of this invention, there is provided a non-transitory recording medium storing a plurality of instructions which, when executed by one or more processors, cause the processors to perform the above-described information processing method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 8 is a sequence diagram illustrating a first exemplary process of the information processing system according to the first embodiment;

FIGS. 9A and 9B are a sequence diagram illustrating a second exemplary process of the information processing system according to the first embodiment;

FIG. 10 is a diagram illustrating merging of address books according to the first embodiment;

FIGS. 11A and 11B are diagrams illustrating the merging of address books according to the first embodiment;

FIGS. 13A and 13B are diagrams illustrating comparative examples;

FIG. 15 is a sequence diagram illustrating an exemplary process of the information processing system according to the second embodiment.

Figure 1:
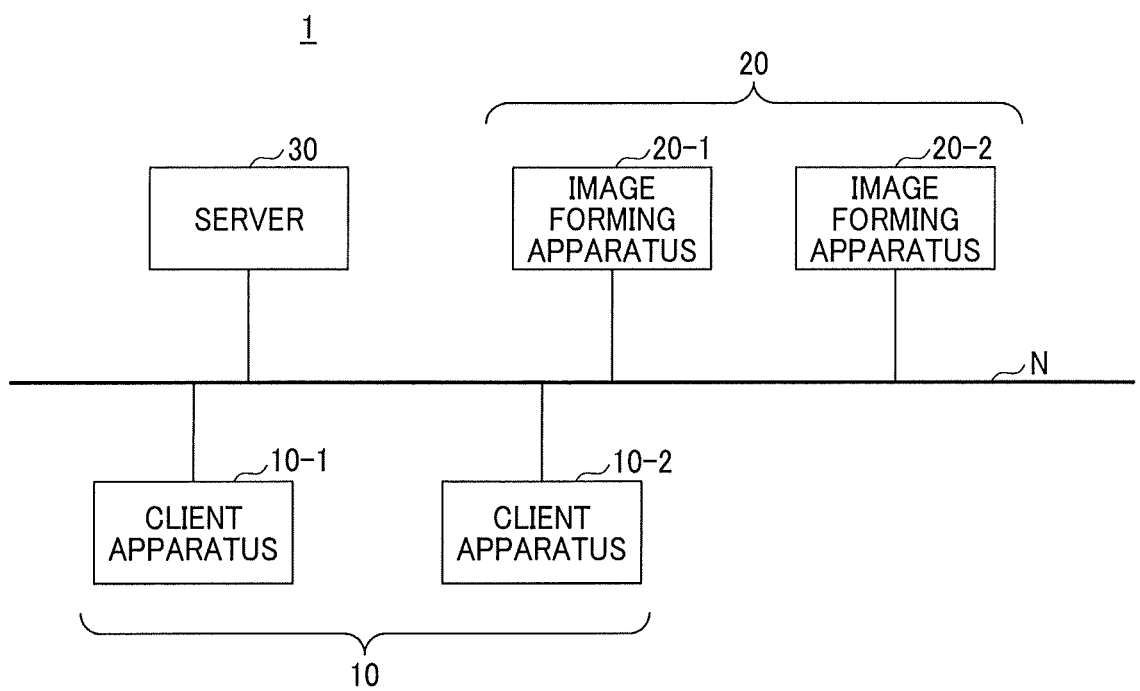
FIG. 1 is a diagram illustrating an exemplary system configuration of an information processing system according to a first embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present invention will be described in detail below with reference to the drawings.

A system configuration of an information processing system 1 according to a first embodiment of the present invention will first be described with FIG. 1.

FIG. 1 is a diagram illustrating an exemplary system configuration of the information processing system 1 according to the first embodiment. As illustrated in FIG. 1, the information processing system 1 according to the first embodiment includes one or more client apparatuses 10 (i.e., client apparatuses 10-1 and 10-2 in the present example), one or more image forming apparatuses 20 (i.e., image forming apparatuses 20-1 and 20-2 in the present example), and a server 30. The client apparatuses 10, the image forming apparatuses 20, and the server 30 are connected via a network N, such as the Internet or a local area network (LAN), to be able to communicate with each other.

The client apparatus 10 is a personal computer (PC), a smartphone, or a tablet terminal, for instance. For example, the client apparatus 10 receives a print instruction from a user, creates print data from print target data, and transmits the print data to the image forming apparatus 20. Alternatively, for example, the client apparatus 10 receives a print instruction from a user, and transmits print target data to the server 30.

Herein, the print target data refers to printable electronic data, such as image data or document data, for example. Further, the print data refers to, for example, electronic data in the page description language (PDL) format converted from the print target data to be printable by the image forming apparatus 20.

The image forming apparatus 20 is a printer or a multifunction peripheral (MFP) with a printing function, for example. The image forming apparatus 20 prints the print data received from the client apparatus 10 or the server 30.

The server 30 is a PC, for instance. For example, the server 30 creates print data from the print target data received from the client apparatus 10, and transmits the created print data to the image forming apparatus 20.

The server 30 may also function as a file server. That is, for example, the server 30 may store the print data received from the client apparatus 10, and in response to a request from the image forming apparatus 20, transmit the stored print data to the image forming apparatus 20 having requested the print data.

Hereinafter, the one or more client apparatuses 10 will be described as the client apparatus 10-1 and the client apparatus 10-2 where distinction therebetween is made. Similarly, the one or more image forming apparatuses 20 will be described as the image forming apparatus 20-1 and the image forming apparatus 20-2 where distinction therebetween is made.

Hardware configurations of the client apparatus 10, the image forming apparatus 20, and the server 30 included in the information processing system 1 according to the first embodiment will now be described with FIGS. 2 and 3.

Figure 2:
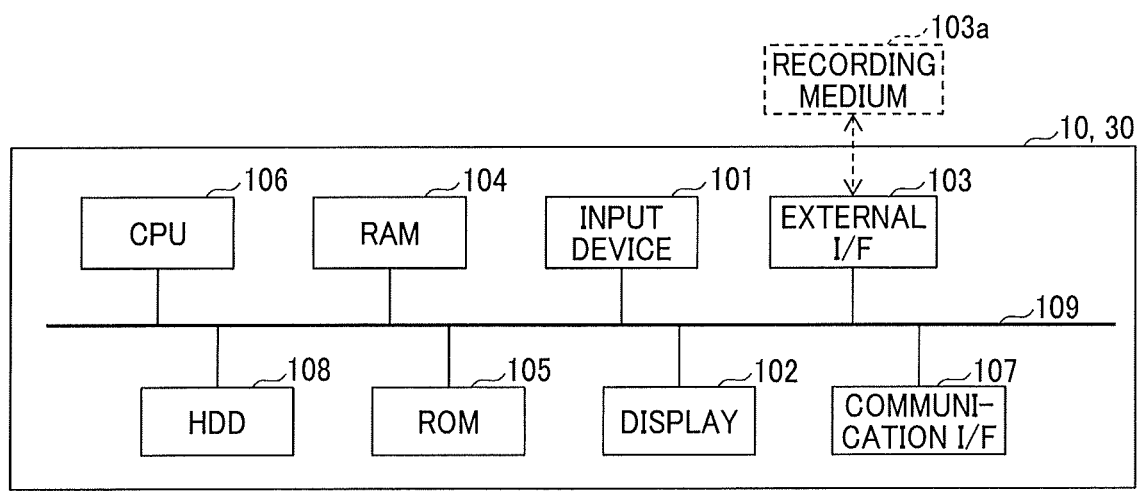
FIG. 2 is a diagram illustrating an exemplary hardware configuration of a client apparatus and a server of the information processing system according to the first embodiment.

FIG. 2 is a diagram illustrating an exemplary hardware configuration of the client apparatus 10 and the server 30 according to the first embodiment. The client apparatus 10 and the server 30 are similar in hardware configuration, and thus the following description will be given of the hardware configuration of the client apparatus 10.

As illustrated in FIG. 2, the client apparatus 10 according to the first embodiment includes an input device 101, a display 102, an external interface (I/F) 103, a random access memory (RAM) 104, a read-only memory (ROM) 105, a central processing unit (CPU) 106, a communication I/F 107, and a hard disk drive (HDD) 108. These hardware components are connected to each other by a bus 109.

The input device 101 includes a keyboard, a mouse, and a touch panel, for example. The input device 101 is used by a user to input operation signals. The display 102 displays a result of processing of the client apparatus 10. At least one of the input device 101 and the display 102 may be used as connected to the client apparatus 10 when necessary.

The communication I/F 107 is an interface that connects the client apparatus 10 to the network N. The client apparatus 10 is capable of performing communication via the communication I/F 107.

The HDD 108 is a nonvolatile storage device that stores programs and data. The programs and data stored in the HDD 108 include an OS that is fundamental software controlling the entire client apparatus 10 and application software that provides a variety of functions on the OS.

In the client apparatus 10, the HDD 108 may be replaced by a drive device using a flash memory as a storage medium, such as a solid state drive (SSD), for example. The programs and data stored in the HDD 108 are managed by a predetermined file system or database (DB).

The external I/F 103 is an interface to an external device such as a recording medium 103a. The client apparatus 10 is capable of performing data reading and data writing on the recording medium 103a via the external I/F 103. The recording medium 103a may be a flexible disk, a compact disc (CD), a digital versatile disc (DVD), a secure digital (SD) memory card, or a universal serial bus (USB) memory, for example.

The ROM 105 is a nonvolatile semiconductor memory capable of holding a program or data even after the client apparatus 10 is powered off. The ROM 505 stores programs and data for use in settings such as OS settings and network settings and a basic input/output system (BIOS) executed at startup of the client apparatus 10. The RAM 104 is a volatile semiconductor memory that temporarily holds a program or data.

The CPU 106 is an arithmetic device that loads programs and data onto the RAM 104 from storage devices such as the ROM 105 and the HDD 108 and executes processing based on the programs and data, thereby controlling the entire client apparatus 10 and implementing functions of the client apparatus 10.

With the hardware configuration illustrated in FIG. 2, the client apparatus 10 and the server 30 according to the first embodiment are capable of executing a variety of processes described later.

Figure 3:
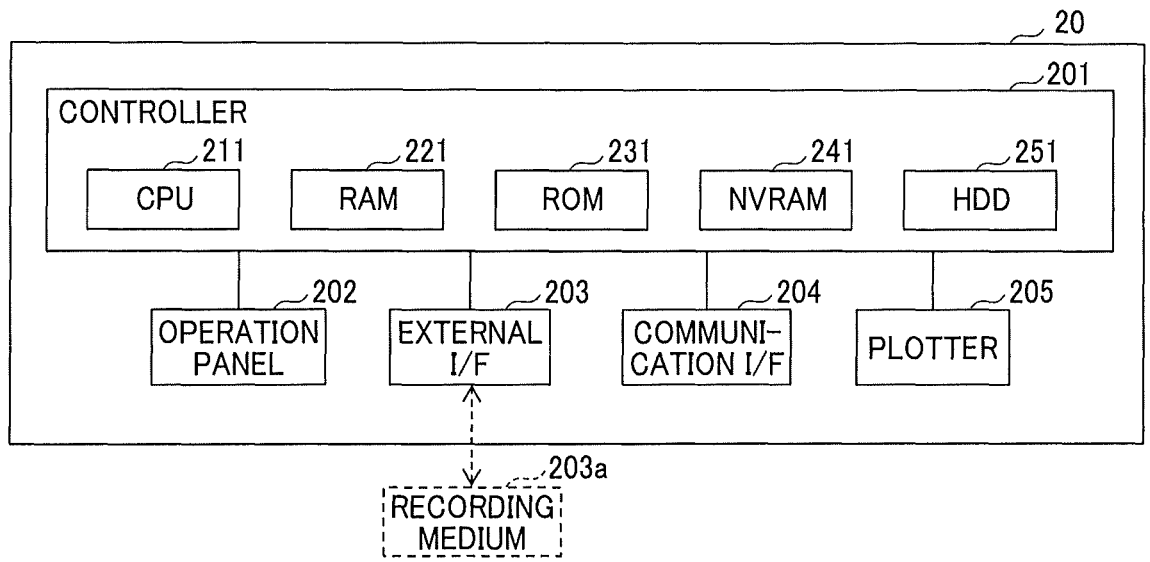
FIG. 3 is a diagram illustrating an exemplary hardware configuration of an image forming apparatus of the information processing system according to the first embodiment.

FIG. 3 is a diagram illustrating an exemplary hardware configuration of the image forming apparatus 20 according to the first embodiment. As illustrated in FIG. 3, the image forming apparatus 20 according to the first embodiment includes a controller 201, an operation panel 202, an external I/F 203, a communication I/F 204, and a plotter 205. The controller 201 includes a CPU 211, a RAM 221, a ROM 231, a nonvolatile RAM (NVRAM) 241, and an HDD 251.

The ROM 231 is a nonvolatile semiconductor memory that stores a variety of programs and data. The RAM 221 is a volatile semiconductor memory that temporarily holds a program or data. The NVRAM 241 stores setting information, for example. The HDD 251 is a nonvolatile storage device that stores a variety of programs and data.

The CPU 211 is an arithmetic device that loads programs, data, and setting information onto the RAM 221 from the ROM 231, the NVRAM 241, and the HDD 251, and executes processing based on the programs, data, and setting information, thereby controlling the entire image forming apparatus 20 and implementing functions of the image forming apparatus 20.

The operation panel 202 includes an input device that receives input from the user and a display that displays information. The external I/F 203 is an interface to an external device such as a recording medium 203a. The image forming apparatus 20 is capable of performing data reading and data writing on the recording medium 203a via the external I/F 203. The recording medium 203a may be an integrated circuit (IC) card, a flexible disk, a CD, a DVD, an SD memory card, or a USB memory, for example.

The communication I/F 204 is an interface that connects the image forming apparatus to the network N. The image forming apparatus 20 is capable of performing communication via the communication I/F 204. The plotter 205 is a printing device that prints the print data.

With the hardware configuration illustrated in FIG. 3, the image forming apparatus according to the first embodiment is capable of executing a variety of processes described later.

A software configuration of the client apparatus 10 according to the first embodiment will now be described with FIG. 4.

Figure 4:
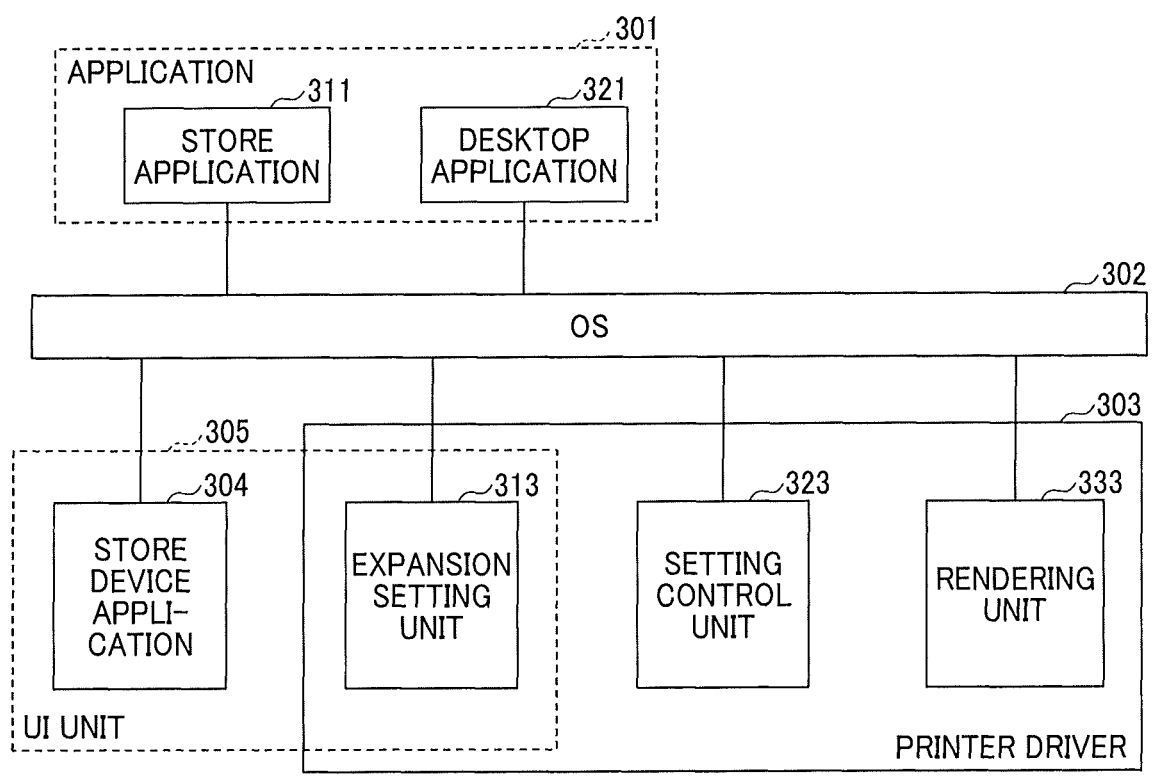
FIG. 4 is a diagram illustrating an exemplary software configuration of the client apparatus according to the first embodiment.

FIG. 4 is a diagram illustrating an exemplary software configuration of the client apparatus 10. As illustrated in FIG. 4, the client apparatus 10 according to the first embodiment includes an application 301, an OS 302, a printer driver 303, and a store device application 304.

The application 301 is application software capable of issuing a print instruction (i.e., request) to the OS 302 in response to a print instruction from the user, such as document preparation software, image viewing and editing software, and a browser, for example. The application 301 includes a store application 311 and a desktop application 321.

The store application 311 is an application available from Windows Store that provides applications to a Windows OS with Windows 8, Windows RT, or a version thereafter, for example. To use the store application 311, a store application user interface (UI) is used. In versions Windows 8 and Windows 8.1, the store application 311 is invoked by a UI called Modern UI or Metro UI, which is provided by the OS 302.

The desktop application 321, on the other hand, is an application available on a Windows OS with Windows 7 or a version prior thereto, for example.

The OS 302 is a Windows OS with Windows 8, Windows RT, or a version thereafter.

The printer driver 303 is a V4 printer driver, for example. The V4 printer driver is a printer driver based on an architecture adopted in versions Windows 8 and Windows RT onwards. In the following, the printer driver 303 will also be described as the V4 printer driver 303.

On a Windows OS with Windows 8 or a version thereafter, the V4 printer driver is available in addition to the V3 printer driver used in versions Windows 2000 to Windows 7.

The printer driver 303 includes an expansion setting unit 313, a setting control unit 323, and a rendering unit 333.

The expansion setting unit 313 performs an operation called printer expansion to display a vendor-unique print setting screen when printing is executed via the desktop application 321.

The setting control unit 323 executes a script called wordwrap script to determine whether a combination of print settings is valid, for example. If the setting control unit 323 determines that a combination of print settings is invalid, the expansion setting unit 313 is capable of hiding display of the combination of print settings, for example.

Further, in response to a request from the application 301 or the OS 302, the setting control unit 323 transmits thereto print capabilities, i.e., information of functions settable by the printer driver 303. Further, in response to a request from the application 301 or the OS 302, the setting control unit 323 acquires, from a devmode property bag, set values of a variety of functions set by the printer driver 303, and transmits a print ticket representing the acquired set values to the application 301 or the OS 302. The setting control unit 323 further stores the set values represented by the print ticket in the devmode property bag.

The print capabilities and the print ticket transmitted to the OS 302 are used to display the current values of the functions and options on the print setting screen displayed by the expansion setting unit 313, for example.

The rendering unit 333 creates the print data from the print target data corresponding to the print instruction issued by the application 301.

When the printing is executed via the store application 311, the store device application 304 displays a vendor-unique print setting screen. The store device application 304 is an application available from Windows Store, similarly to the store application 311.

When the printing is executed via the desktop application 321, the printer driver 303 is capable of creating the print data based on the settings performed on the print setting screen displayed by the expansion setting unit 313. When the printing is executed via the store application 311, on the other hand, the printer driver 303 is capable of creating the print data based on the settings performed on the print setting screen displayed by the store device application 304.

The expansion setting unit 313 and the store device application 304 form a UI unit 305 that displays a vendor-unique print setting screen.

Storage areas accessible by the V4 printer driver 303 and the store device application 304 will now be described with FIG. 5.

Figure 5:
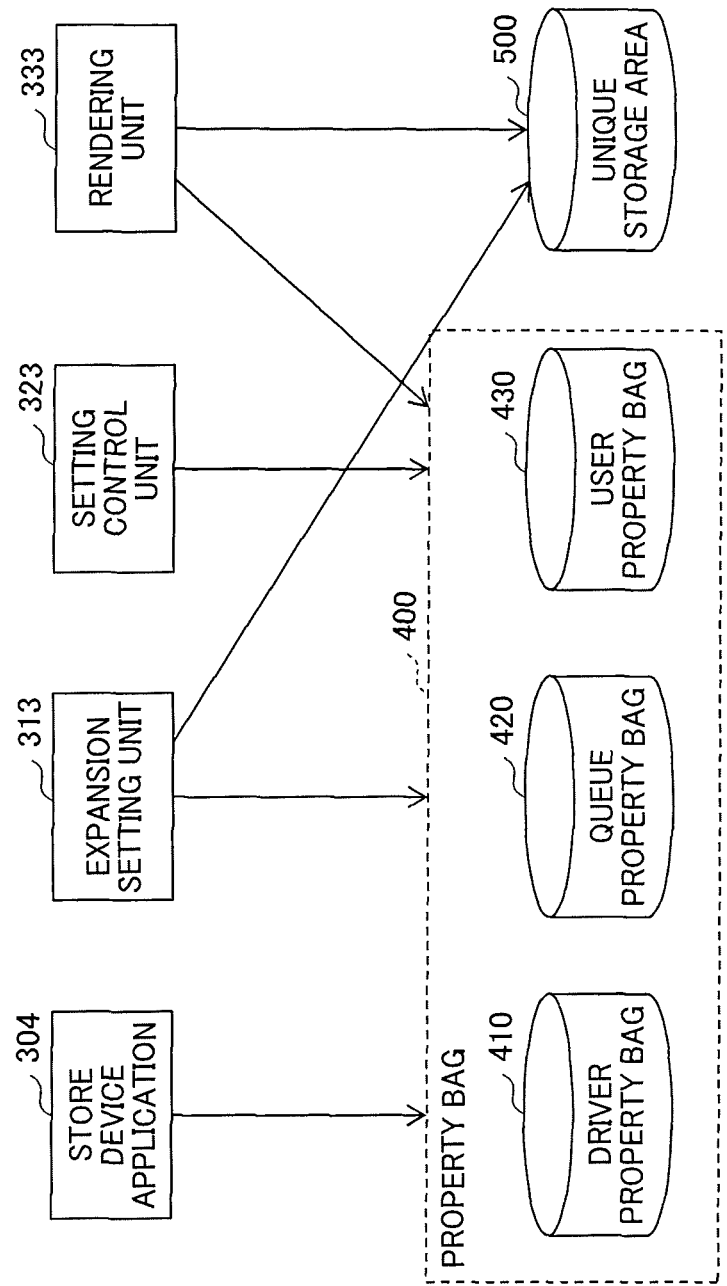
FIG. 5 is a diagram illustrating storage areas accessible by a V4 printer driver and a store device application.

FIG. 5 is a diagram illustrating storage areas accessible by the V4 printer driver 303 and the store device application 304. As illustrated in FIG. 5, the expansion setting unit 313, the setting control unit 323, the rendering unit 333, and the store device application 304 are capable of accessing a storage area called a property bag 400. Access to such a storage area is enabled by an application programming interface (API) provided by the OS 302.

As illustrated in FIG. 5, the property bag 400 includes a driver property bag 410, a queue property bag 420, and a user property bag 430.

The driver property bag 410 is a storage area that stores information such as configuration information determined when the V4 printer driver 303 is created. The expansion setting unit 313, the setting control unit 323, the rendering unit 333, and the store device application 304 are capable of reading a variety of information from the driver property bag 410, but are incapable of writing information to the driver property bag 410.

The queue property bag 420 is a storage area that stores information such as setting information of each logical printer (i.e., printer icon). The expansion setting unit 313 and the store device application 304 are capable of writing and reading a variety of information to and from the queue property bag 420. Further, the setting control unit 323 and the rendering unit 333 are capable of reading a variety of information from the queue property bag 420.

The logical printer refers to a virtual printer displayed as a printer icon in a print folder of the OS 302, for instance. For example, the user of the client apparatus 10 is capable of creating, for one image forming apparatus 20, a plurality of logical printers different in setting information (e.g., sheet size, sheet orientation, and print quality).

The user property bag 430 is a storage area that stores, for each logical printer, information such as setting information of each user. The expansion setting unit 313, the setting control unit 323, and the store device application 304 are capable of writing and reading a variety of information to and from the user property bag 430.

The expansion setting unit 313 and the rendering unit 333 are further capable of writing and reading a variety of information to and from an unique storage area 500.

The unique storage area 500 is a storage area different from the property bag 400, and is implemented by a registry or file, for example. The unique storage area 500 is defined by, for example, the vendor that provides the V4 printer driver 303.

The store device application 304 is incapable of accessing a storage area other than the property bag 400 owing to a restriction imposed by the OS 302. Further, the setting control unit 323 is incapable of accessing a storage area other than the foregoing devmode property bag and the property bag 400. That is, the store device application 304 and the setting control unit 323 are incapable of writing and reading a variety of information to and from the unique storage area 500.

The above-described restrictions are similar to a restriction imposed on the store application 311. These restrictions are imposed to prevent, for example, the store device application 304 and the setting control unit 323 from changing a storage area such as a registry used by the OS 302 and thereby adversely affecting the operation of the OS 302. This technique is called sandboxing.

A more detailed exemplary system configuration of the information processing system 1 according to the first embodiment will now be described.

Figure 6:
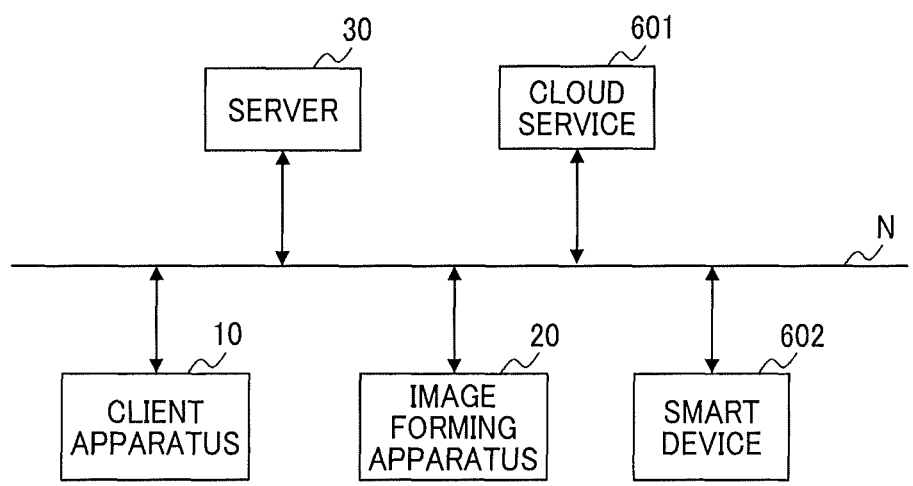
FIG. 6 is a diagram illustrating a modified example of the exemplary system configuration of the information processing system according to the first embodiment.

FIG. 6 is a diagram illustrating a modified example of the exemplary system configuration of the information processing system 1 according to the first embodiment. As illustrated in FIG. 6, the information processing system 1 according to the modified example of the first embodiment includes the client apparatus 10, the image forming apparatus 20, the server 30, a cloud service 601, and a smart device 602, for example. These components are connected via the network N, such as the Internet or a LAN, for example, to be able to communicate with each other. The client apparatus 10, the image forming apparatus 20, and the server 30 in FIG. 6 are similar to those in FIG. 1. In FIG. 6, each of the client apparatus and the image forming apparatus 20 may be singular or plural similarly as in FIG. 1.

The client apparatus 10 according to the modified example of the first embodiment has a function of transmitting output data to a transmission destination device, such as the image forming apparatus 20, the server 30, the cloud service 601, or the smart device 602. The output data may be the print data generated by the client apparatus 10 or an electronic file, for example.

The image forming apparatus 20 is an example of the transmission destination device to which the client apparatus 10 transmits the output data. For example, the image forming apparatus 20 prints data such as the print data transmitted from the client apparatus 10 and facsimile data.

The server 30 is an example of the transmission destination device to which the client apparatus 10 transmits the output data. For example, the server 30 stores the output data such as the electronic file or print data transmitted from the client apparatus 10, and provides a service using the stored electronic file or print data.

The cloud service 601 is an information processing apparatus such as a PC or a system including a plurality of information processing apparatuses, for example. The cloud service 601 is an example of the transmission destination device to which the client apparatus transmits the output data. For example, the cloud service 601 may be a service on the Internet for uploading the output data output by the client apparatus 10, and may be provided outside the information processing system 1.

The smart device 602 is an information terminal such as a smartphone, a tablet terminal, a smart robot, a smart speaker, or a wearable terminal, for example. The smart device 602 is an example of the transmission destination device to which the client apparatus transmits the output data.

The cloud service 601 and the smart device 602 has the hardware configuration of a typical computer, such as the hardware configuration illustrated in FIG. 2, for example.

A functional configuration of the client apparatus 10 according to the first embodiment will be described.

Figure 7:
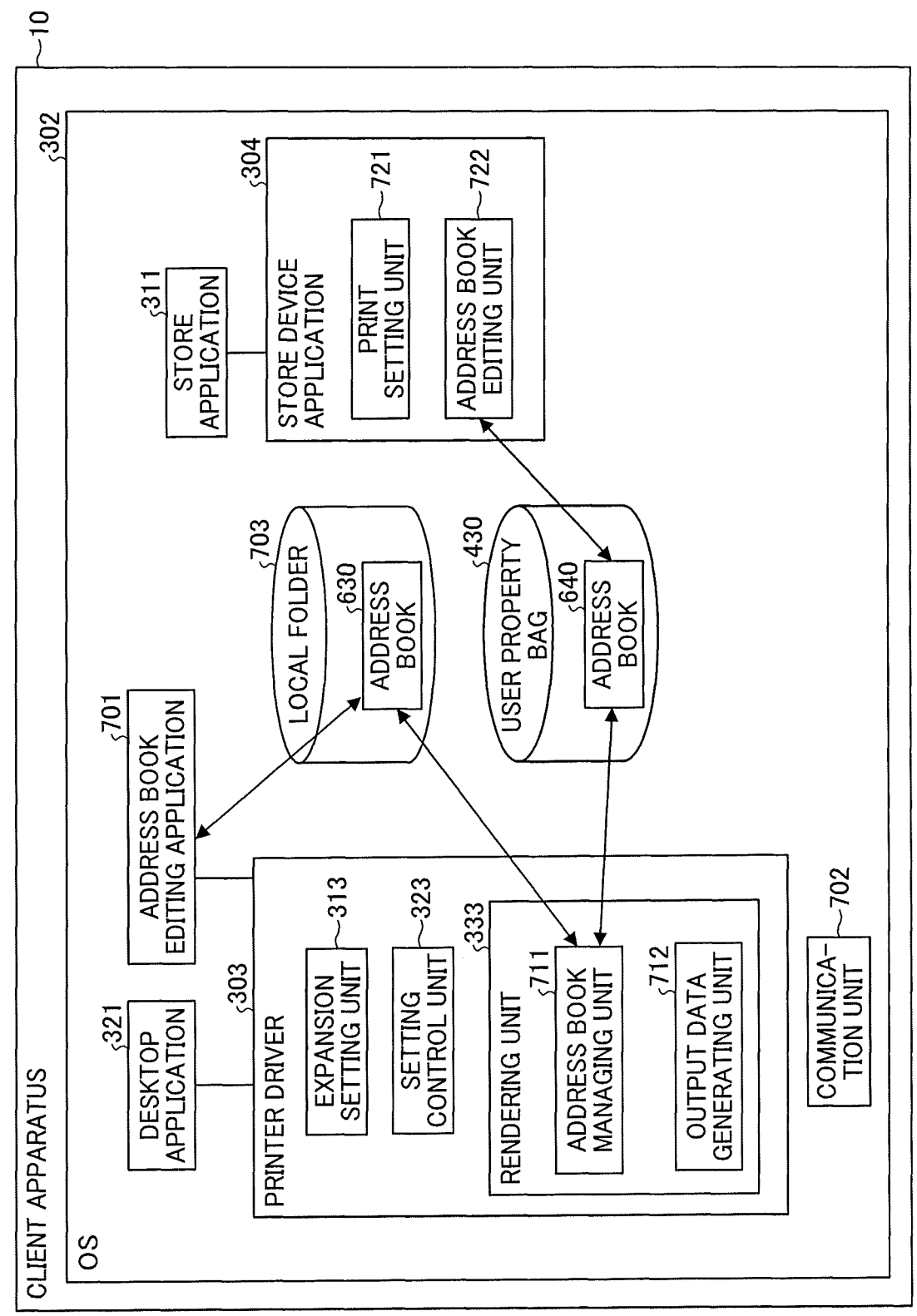
FIG. 7 is a diagram illustrating an exemplary functional configuration of the client apparatus according to the first embodiment.

FIG. 7 is a diagram illustrating an exemplary functional configuration of the client apparatus 10 according to the first embodiment. The client apparatus 10 is an information processing apparatus that executes programs such as the OS 302, the printer driver 303, the store device application 304, the store application 311, the desktop application 321, and an address book editing application 701. The OS 302, the printer driver 303, the store device application 304, and the desktop application 321 illustrated in FIG. 7 are similar to those illustrated in FIG. 4.

The address book editing application 701 is a program (i.e., desktop application) invoked by the expansion setting unit 313 of the printer driver 303. For example, when the user performs an operation of editing an address book by invoking the print setting screen via the desktop application 321, the address book editing application 701 is automatically started by the expansion setting unit 313.

With the address book editing application 701, the user is capable of performing operations such as creation, editing, and deletion of an address book 630 (i.e., a first address book) stored in a local folder 703 (i.e., a first memory area).

A communication unit 702 is a module that enables the printer driver 303 to communicate with the transmission destination device, such as the image forming apparatus 20, the server 30, the cloud service 601, or the smart device 602, and is provided by the OS 302, for example. Alternatively, as another example, the communication unit 702 may be included in the rendering unit 333 or the expansion setting unit 313 of the printer driver 303.

The local folder 703 (i.e., the first memory area) is a storage area editable by the expansion setting unit 313 (i.e., processing circuitry), and stores the address book 630, for example. The local folder 703 is a folder created in a storage device such as the HDD 108 in FIG. 2. For example, the local folder 703 is a predetermined folder under C:¥temp on a Windows OS.

As described above, the user property bag 430 (e.g., a second memory area) is a storage area editable by the store device application 304 (i.e., the processing circuitry), such as a registry. The user property bag 430 stores an address book 640 (i.e., a second address book), for example.

A description will be given of a functional configuration of the printer driver 303, which is a V4 printer driver or a printer driver having an architecture similar to that of the V4 printer driver. The following description will be given on the assumption that the printer driver 303 is a V4 printer driver.

In the client apparatus 10, the printer driver 303 is executed by the CPU 106 in FIG. 2, for example, to implement functions such as the expansion setting unit 313, the setting control unit 323, and the rendering unit 333.

As described above, when the printing is executed via the desktop application 321, the expansion setting unit 313 (i.e., the processing circuitry) displays a print setting screen (i.e., a first setting screen) for performing settings of the printer driver 303. The expansion setting unit 313 is capable of reading the address book 630 stored in the local folder 703.

As described above, the setting control unit 323 manages print setting information (e.g., the print ticket) and setting capacity information (e.g., the print capacities) of the printer driver 303 with the wordwrap script.

As described above, the rendering unit 333 generates the print data printable by the image forming apparatus 20 from the print target data. The rendering unit 333 of the first embodiment implements an address book managing unit 711 and an output data generating unit 712, for example.

The output data generating unit 712 generates the output data in a predetermined format from output target data to be output to an output destination device, such as the image forming apparatus 20, the server 30, the cloud service 601, or the smart device 602, for instance. For example, the output data generating unit 712 generates the print data printable by the image forming apparatus 20 from the print target data. The output data generating unit 712 further generates display data displayable on the smart device 602 from the output target data to be output to the smart device 602. The output data generating unit 712 further generates, from the output target data to be output to the server 30 or the cloud service 601, the output data such as a document file, image data, or print data to be stored in the server 30 or the cloud service 601.

The address book managing unit 711 is capable of editing the address book 630 and the address book 640. The address book managing unit 711 merges (i.e., synchronizes or updates) the address book 630 and the address book 640 to have the same data content.

Preferably, when the output data generating unit 712 generates the output data, the address book managing unit 711 merges the address book 630 and the address book 640 to have the same data content.

A functional configuration of the store device application 304 will be described.

As described above, the store device application 304 (i.e., the processing circuitry) is a program that displays a print setting screen (i.e., a second setting screen) for performing settings of the printer driver 303 when the printing is executed via the store application 311.

In the client apparatus 10, the printer driver 303 is executed by the CPU 106 in FIG. 2, for example, to implement a print setting unit 721 and an address book editing unit 722.

When the printing is executed via the store application 311, the print setting unit 721 displays, on the display 102 in FIG. 2, for example, the print setting screen (i.e., the second setting screen) for performing the settings of the printer driver 303. The print setting unit 721 is capable of reading the address book 640 stored in the user property bag 430.

The address book editing unit 722 is invoked by the print setting unit 721. In accordance with an operation performed by the user, the address book editing unit 722 performs an operation such as creation, editing, or deletion of the address book 640 stored in the user property bag 430.

With the above-described configuration, when editing the address book via the desktop application 321, the user is capable of editing and storing the address book 630 by starting the address book editing application 701 on the first setting screen displayed by the expansion setting unit 313.

Further, when executing the printing via the desktop application 321, the user is capable of executing the printing by reading the address book 630 and specifying an address on the first setting screen displayed by the expansion setting unit 313. In this process, the address book managing unit 711 of the rendering unit 333 reads and merges the address book 630 and the address book 640 such that the address book 630 and the address book 640 have the same data content, to thereby update the address book 630 and the address book 640.

When editing the address book via the store application 311, on the other hand, the user is capable of editing and storing the address book 640 on the second setting screen displayed by the store device application 304.

Further, when executing the printing via the store application 311, the user is capable of executing the printing by reading the address book 640 and specifying an address on the second setting screen displayed by the store device application 304. In this process, the address book managing unit 711 of the rendering unit 333 reads and merges the address book 630 and the address book 640 such that the address book 630 and the address book 640 have the same data content, to thereby update the address book 630 and the address book 640.

When the user thus edits, via the store application 311, the address book 640 stored in the user property bag 430, the edited content is reflected in the address book 630 stored in the local folder 703.

According to the first embodiment, therefore, the address book 630 stored in the local folder 703 in the client apparatus 10 is easily editable on the setting screen for the store application 311 provided by the V4 printer driver 303.

Processing procedures of an information processing method according to the first embodiment will now be described.

A first process of the information processing system 1 according to the first embodiment will first be described.

FIG. 8 is a sequence diagram illustrating a first exemplary process of the information processing system 1 according to the first embodiment. FIG. 8 illustrates an example of a printing process performed when the user specifies the address by using the address book via the store application 311, to thereby transmit the output data to a transmission destination device 800, such as the image forming apparatus 20, the server 30, the cloud service 601, or the smart device 602.

The printing process according to the first embodiment includes not only the printing process using the image forming apparatus 20 but also various other processes, such as generating the output data in the predetermined format from the output target data for which the user performs the printing operation, and outputting the generated output data to the transmission destination device 800.

At step S801, the user, who performs a printing operation via the store application 311, performs an editing operation of editing the address book (i.e., the address book 640) on the print setting screen provided by the store device application 304. The editing operation may be adding an address to the address book or changing transmission destination information in the address book, for example.

If the user newly creates an address book in this case, the process of step S802 is executed. At step S802, the user performs an operation of specifying the path of a storage destination at which the address book is to be stored (e.g., C:¥temp¥address.csv).

At step S803, the user performs an operation of storing the address book (i.e., the address book 640). Thereby, at step S804, the address book editing unit 722 of the store device application 304 stores (i.e., saves) the edited address book 640 in the user property bag 430.

At step S805, with the stored address book (i.e., the address book 640), the user performs a transmission destination specifying operation of specifying the transmission destination device 800 on the print setting screen provided by the store device application 304.

At step S806, the user performs the printing operation via the store application 311. At steps S807 and S808, the store application 311 transmits a print request to the rendering unit 333 of the printer driver 303 via the OS 302 to request printing. The print request includes the print setting information (i.e., the print ticket), which includes the output (i.e., print) target data and the information of the transmission destination set by the store device application 304, for example.

At step S809, the output data generating unit 712 of the rendering unit 333 generates the output data in the predetermined format from the output target data in accordance with the print setting information included in the print request.

At step S810, the output data generating unit 712 of the rendering unit 333 transmits, via the communication unit 702, the generated output data to the transmission destination device 800 set in the print setting information. In this process, the output data generating unit 712 may output the generated output data (i.e., file) to a storage device such as the HDD 108 or the RAM 104 of the client apparatus 10.

At step S811, the address book managing unit 711 of the rendering unit 333 refers to the storage destination of the address book 630 in the local folder 703.

When the address book 630 is newly created, the process of step S812 is executed. At step S812, the address book managing unit 711 of the rendering unit 333 creates the address book 630 in the local folder 703.

At step S813, the address book managing unit 711 of the rendering unit 333 merges the address book 640 stored in the user property bag 430 and the address book 630 stored in the local folder 703. Merging of the address book 640 and the address book 630 will be described in detail later with FIGS. 10 to 11B.

A second process of the information processing system 1 according to the first embodiment will be described.

Figure 9B:
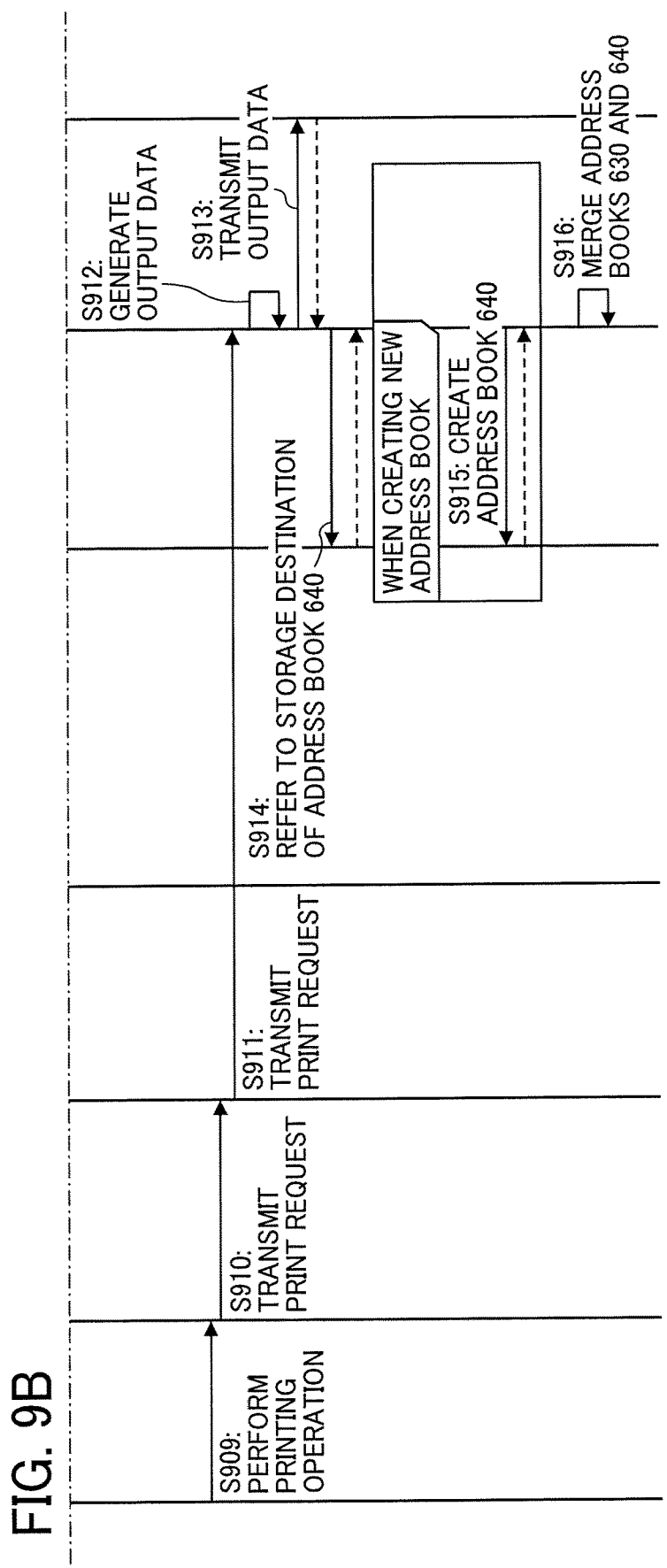

FIGS. 9A and 9B are a sequence diagram illustrating a second exemplary process of the information processing system 1 according to the first embodiment. FIGS. 9A and 9B illustrate an example of a printing process performed when the user specifies the address by using the address book via the desktop application 321, to thereby transmit the output data to the transmission destination device 800, such as the image forming apparatus 20, the server 30, the cloud service 601, or the smart device 602.

At step S901, the user, who performs a printing operation via the desktop application 321, performs an operation of starting the address book editing application 701 on the print setting screen (i.e., the first setting screen) provided by the expansion setting unit 313. For example, the user selects an address edit button displayed on the print setting screen provided by the expansion setting unit 313.

Thereby, at step S902, the expansion setting unit 313 starts the address book editing application 701.

At step S903, the user performs an editing operation of editing the address book (i.e., the address book 630) on, for example, an address book editing screen provided by the address book editing application 701. The editing operation may be adding an address to the address book or changing transmission destination information in the address book, for example.

If the user newly creates an address book in this case, the process of step S904 is executed. At step S904, the user performs an operation of specifying the path of a storage destination at which the address book is to be stored (e.g., C:¥temp¥address.csv).

At step S905, the user performs an operation of storing the address book (i.e., the address book 630). Thereby, at step S906, the address book editing application 701 stores the edited address book 630 in the local folder 703.

At step S907, the user performs an operation of completing the address book editing application 701. For example, the user selects a complete button displayed on the address book editing screen displayed by the address book editing application 701.

At step S908, with the stored address book (i.e., the address book 630). the user performs a transmission destination specifying operation of specifying the transmission destination device 800 on the print setting screen displayed by the expansion setting unit 313.

At step S909, the user performs a printing operation via the desktop application 321.

At steps S910 and S911, the desktop application 321 transmits a print request to the rendering unit 333 of the printer driver 303 via the OS 302 to request printing. The print request includes the print setting information (i.e., the print ticket), which includes the output (i.e., print) target data and the information of the transmission destination set by the expansion setting unit 313, for example.

At step S912, the output data generating unit 712 of the rendering unit 333 generates the output data in the predetermined format from the output target data in accordance with the print setting information included in the print request.

At step S913, the output data generating unit 712 of the rendering unit 333 transmits, via the communication unit 702, the generated output data to the transmission destination device 800 set in the print setting information. In this process, the output data generating unit 712 may output the generated output data (i.e., file) to a storage device such as the HDD 108 or the RAM 104 of the client apparatus 10.

At step S914, the address book managing unit 711 of the rendering unit 333 refers to the storage destination of the address book 640 stored in the user property bag 430.

When the address book 640 is newly created, the process of step S915 is executed. At step S915, the address book managing unit 711 of the rendering unit 333 creates the address book 640 in the user property bag 430.

At step S916, the address book managing unit 711 of the rendering unit 333 merges the address book 640 stored in the user property bag 430 and the address book 630 stored in the local folder 703.

The merging of the address book 640 and the address book 630 will be described.

FIGS. 10 to 11B are diagrams illustrating the merging of the address book 640 and the address book 630 according to the first embodiment.

It is possible to simultaneously start the address book editing application 701 invoked by the expansion setting unit 313 of the printer driver 303 and the address book editing unit 722 of the store device application 304. It is therefore desired to manage the two address books, i.e., the address book 640 and the address book 630, to have the same content.

For example, it is assumed that the address book 630 and the address book 640 store data DA, i.e., the address book 630 and the address book 640 store the same data content, at the beginning of the process illustrated in FIG. 10.

It is also assumed that the address book editing application 701 reads and edits the data DA from the address book 630 at step S1001, and stores the data DA with changed content in the address book 630 as data DB at step S1002.

It is further assumed that the address book editing unit 722 reads and edits the data DA from the address book 640 at step S1003, and stores the data DA with changed content in the address book 640 as data DC at step S1004.

In this case, the data DB in the address book 630 and the data DC in the address book 640 may be different in data content.

Therefore, the address book managing unit 711 reads the data DB from the address book 630 at step S1005, reads the data DC from the address book 640 at step S1006, and creates data DD with the read data DB and DC at step S1007 such that the address book 630 and the address book 640 are updated to have the same data content.

Further, the address book managing unit 711 stores the created data DD in the address book 630 at step S1008, and stores the data DD in the address book 640 at step S1009. Thereby, the address book 630 and the address book 640 are updated to have the same data content.

The above-described processes of steps S1005 and S1006 will be referred to as the merging or the merging process in the first embodiment. For example, the address book managing unit 711 executes the merging process when the output data generating unit 712 of the rendering unit 333 creates the output data.

The processes of steps S1008 and S1009 in FIG. 10 may be omitted when there is no difference in data content between the address book 630 and the address book 640. Further, the processes of steps S1007 to S1009 may be omitted when the address book 630 and the address book 640 are not edited.

A specific example of the merging process will now be described with FIGS. 11A and 11B.

FIG. 11A illustrates exemplary images of the data DA, DB, DC, and DD in the address book 630 and the address book 640 (hereinafter referred to as the address book data DA, DB, DC, and DD). In the example of FIG. 11A, each of the address book data DA, DB, DC, and DD includes information such as NUMBER, NAME, TRANSMISSION DESTINATION INFORMATION and UPDATE.

Herein, NUMBER represents a management (i.e., record) number for managing a corresponding record, for example. NAME represents information of the name of the user or the transmission destination. TRANSMISSION DESTINATION INFORMATION represents information of the address of the transmission destination, such as the facsimile number, electronic mail address, or uniform resource locator (URL) of the transmission destination, for example. UPDATE represents information indicating whether a corresponding record is updated. For example, 1 is set as the value of UPDATE for a record with updated information, and 0 is set as the value of UPDATE for a record with non-updated information.

Each of the address book data DA, DB, DC, and DD also includes a storage time representing the time at which the data is stored.

For example, in the address book data DB in FIG. 11A, the transmission destination information is updated in the record with number 1 and the record with number 2 by the address book editing application 701. Further, the address book data DB is stored in the address book 630 at a storage time of 12:02.

Further, in the address book data DC, the transmission destination information is updated in the record with number 2 and the record with number 3 by the address book editing unit 722. Further, the address book data DC is stored in the address book 640 at a storage time of 12:04.

In this case, the address book managing unit 711 compares the storage time of data included in the address book 630 with the storage time of data included in the address book 640, and uses one of the two types of data with the latest storage time to create the latest address book data DD.

For example, in the example of FIG. 11A, the record with number 1 is updated in the address book data DB at the storage time of 12:02, but is not updated in the address book data DC. Therefore, the transmission destination information 111-111-1114 in the address book data DB is the data with the latest storage time, and is stored in the record with number 1 in the address book data DD.

Further, the record with number 2 is updated in the address book data DB at the storage time of 12:02, and is updated in the address book data DC at the storage time of 12:04. Therefore, the transmission destination information 222-222-2226 in the address book data DC with the more recent storage time is the data with the latest storage time, and is stored in the record with number 2 in the address book data DD.

Further, the record with number 3 is not updated in the address book data DB, but is updated in the address book data DC at the storage time of 12:04. Therefore, the transmission destination information 333-333-3337 in the address book data DC is the data with the latest storage time, and is stored in the record with number 3 in the address book data DD.

Through the above-described process, the address book data DB as the data content of the address book 630 and the address book data DC as the data content of the address book 640 are merged to create the address book data DD as the data content of the latest address book.

FIG. 11B illustrates different exemplary images of the address book data DA, DB, DC, and DD. In the example of FIG. 11B, each of the address book data DA, DB, DC, and DD includes the information of STORAGE TIME in place of UPDATE in FIG. 11A.

Herein, STORAGE TIME represents information of the time at which a corresponding record is updated. A mark "-" is recorded for a non-updated record. For example, FIG. 11B indicates that the record with number 1 is updated at a storage time of 12:01 but the record with number 3 is not updated in the address book data DB.

In this case, too, the address book managing unit 711 compares the storage time of data included in the address book 630 with the storage time of data included in the address book 640, and uses one of the two types of data with the latest storage time to create the latest address book data DD.

For example, in the example of FIG. 11B, the record with number 1 is updated in the address book data DB at the storage time of 12:01, but is not updated in the address book data DC. Therefore, the transmission destination information 111-111-1114 in the address book data DB is the data with the latest storage time, and is stored in the record with number 1 in the address book data DD.

Further, the record with number 2 is updated in the address book data DB at the storage time of 12:02, and is updated in the address book data DC at a storage time of 12:03. Therefore, the transmission destination information 222-222-2226 in the address book data DC with the more recent storage time is the data with the latest storage time, and is stored in the record with number 2 in the address book data DD.

Further, the record with number 3 is not updated in the address book data DB, but is updated in the address book data DC at the storage time of 12:04. Therefore, the transmission destination information 333-333-3337 in the address book data DC is the data with the latest storage time, and is stored in the record with number 3 in the address book data DD.

Through the above-described process, too, the address book data DB as the data content of the address book 630 and the address book data DC as the data content of the address book 640 are merged to create the address book data DD as the data content of the latest address book.

The address book data DA, DB, DC, and DD illustrated in FIGS. 11A and 11B are illustrative for explanatory purposes, and thus the address book data DA, DB, DC, and DD may be configured in another format. For example, STORAGE TIME illustrated in FIGS. 11A and 11B may be replaced by information such as STORAGE DATE AND TIME, UPDATE TIME, or UPDATE DATE AND TIME. Further, the information of TRANSMISSION DESTINATION INFORMATION may include the information of a plurality of transmission destinations. Further, the information of NAME may include the information such as the name, identification information, or account information corresponding to the transmission destination device.

With reference to FIGS. 12A to 13B, a description will now be given of comparative examples in which the address book is stored in a different storage area accessible by the store device application 304.

Figure 12A:
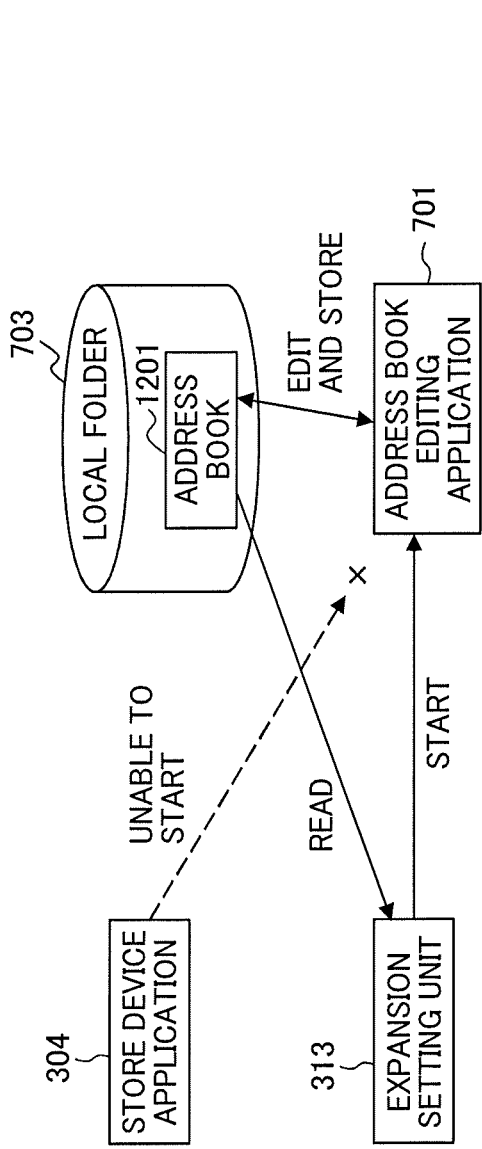
FIGS. 12A and 12B are diagrams illustrating comparative examples.

In a first comparative example, an address book 1201 is stored in the local folder 703, for example, as illustrated in FIG. 12A.

In this case, the expansion setting unit 313 of the printer driver 303 is capable of reading the address book 1201, and is capable of editing and storing the address book 1201 by starting the address book editing application 701, similarly as in the first embodiment.

The store device application 304, on the other hand, is unable to start an executable (exe) file owing to a restriction imposed by the OS 302, and thus is unable to edit and store the address book 1201 by starting the address book editing application 701.

Figure 12B:
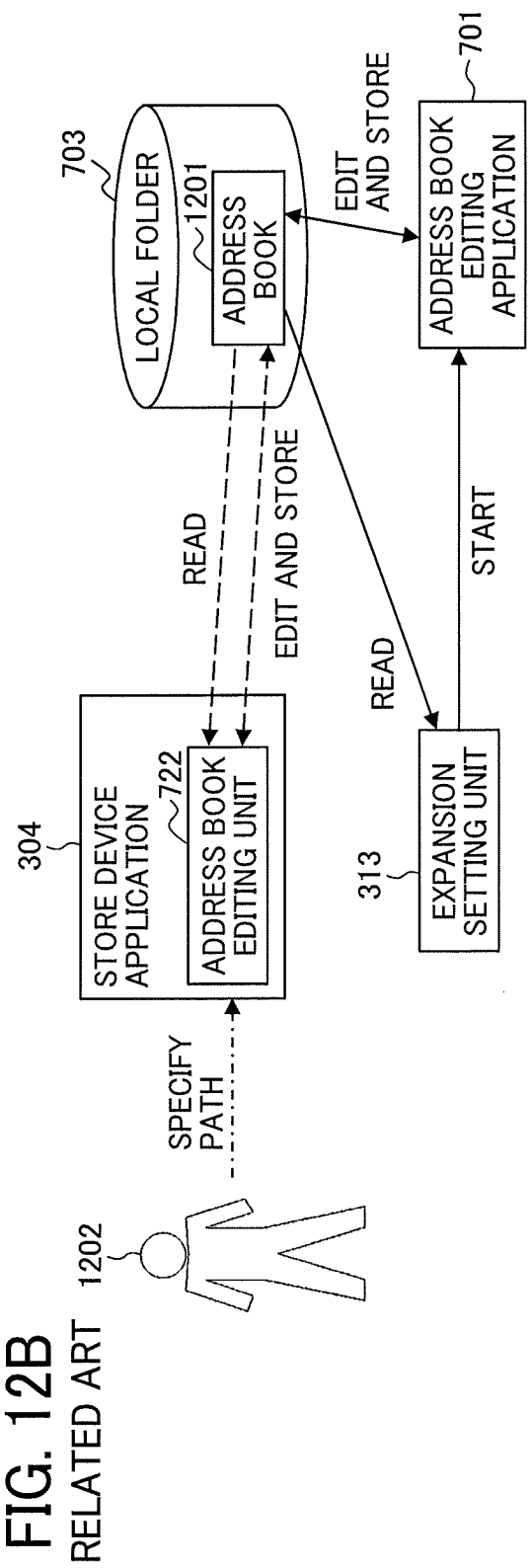

In a second comparative example, the address book 1201 stored in the local folder 703 is read, edited, and stored by the address book editing unit 722 of the store device application 304, for example, as illustrated in FIG. 12B.

In this case, each time a user 1202 accesses the address book 1201 stored in the local folder 703, the user 1202 specifies the file path of the address book 1201 for the store device application 304. This configuration, therefore, compromises usability for the user 1202.

In a third comparative example, an address book 1311 is stored in the user property bag 430, for example, as illustrated in FIG. 13A.

In this case, the expansion setting unit 313 of the printer driver 303 is capable of reading the address book 1311, and is capable of editing and storing the address book 1311 by starting the address book editing application 701, similarly as in the first embodiment.

Further, the store device application 304 is also capable of reading, editing, and storing the address book 1311 by using the address book editing unit 722.

However, the user property bag 430 is a storage area corresponding to the printer driver 303. If the printer driver 303 is uninstalled, therefore, the address book 1311 is deleted.

In a fourth comparative example, an address book 1322 is stored in a local cache 1321 of the store device application 304, for example, as illustrated in FIG. 13B.

In this case, the store device application 304 is capable of reading, editing, and storing the address book 1322 by using the address book editing unit 722.

However, the local cache 1321 of the store device application 304 is only accessible by the store device application 304. Therefore, the expansion setting unit 313 of the printer driver 303 is inaccessible to the address book 1322. Further, in this case, if the store device application 304 is uninstalled, for example, the address book 1322 is deleted.

In a fifth comparative example, the address book may be stored in an external apparatus such as the image forming apparatus 20, for example. This configuration, however, increases the time taken for the expansion setting unit 313 of the printer driver 303 and the store device application 304 to acquire the address book.

As described above, it is difficult to enable the user of the V4 printer driver to read, edit, and store the address book via both the store application 311 and the desktop application 321.

The client apparatus 10 according to the first embodiment, on the other hand, enables the user to read, edit, and store the address book via both the store application 311 and the desktop application 321.

For example, unlike the above-described first to fifth comparative examples, the first embodiment does not require the user to specify the file path of the address book each time the user accesses the address book. Further, according to the first embodiment, the address book is not deleted even when the printer driver 303 or the store device application 304 is uninstalled. Further, the time for reading the address book is not increased.

In the first embodiment, the address book 630 is stored in the local folder 703 in a storage device such as the HDD 108 of the client apparatus 10, for example. Even if the printer driver 303 or the store device application 304 is deleted, therefore, the address book 630 is not deleted.

Further, in the first embodiment, when the user edits the address book on the print setting screen displayed by the store device application 304, the address book 640 stored in the user property bag 430 is edited. Therefore, the user is not required to specify the file path of the address book each time the user accesses the address book. The edited content of the address book 640 is automatically reflected in the address book 630 stored in the local folder 703, for example, by the address book managing unit 711.

Further, in the first embodiment, the address book is not stored in an external apparatus such as the image forming apparatus 20, for example. Therefore, the time for acquiring the address book is not increased.

As described above, according to the first embodiment, the address book 630 stored in the local folder 703 (i.e., the first memory area) in the client apparatus 10 is easily editable on the setting screen for the store application 311 provided by the V4 printer driver 303.

A second embodiment of the present invention will now be described.

Figure 14:
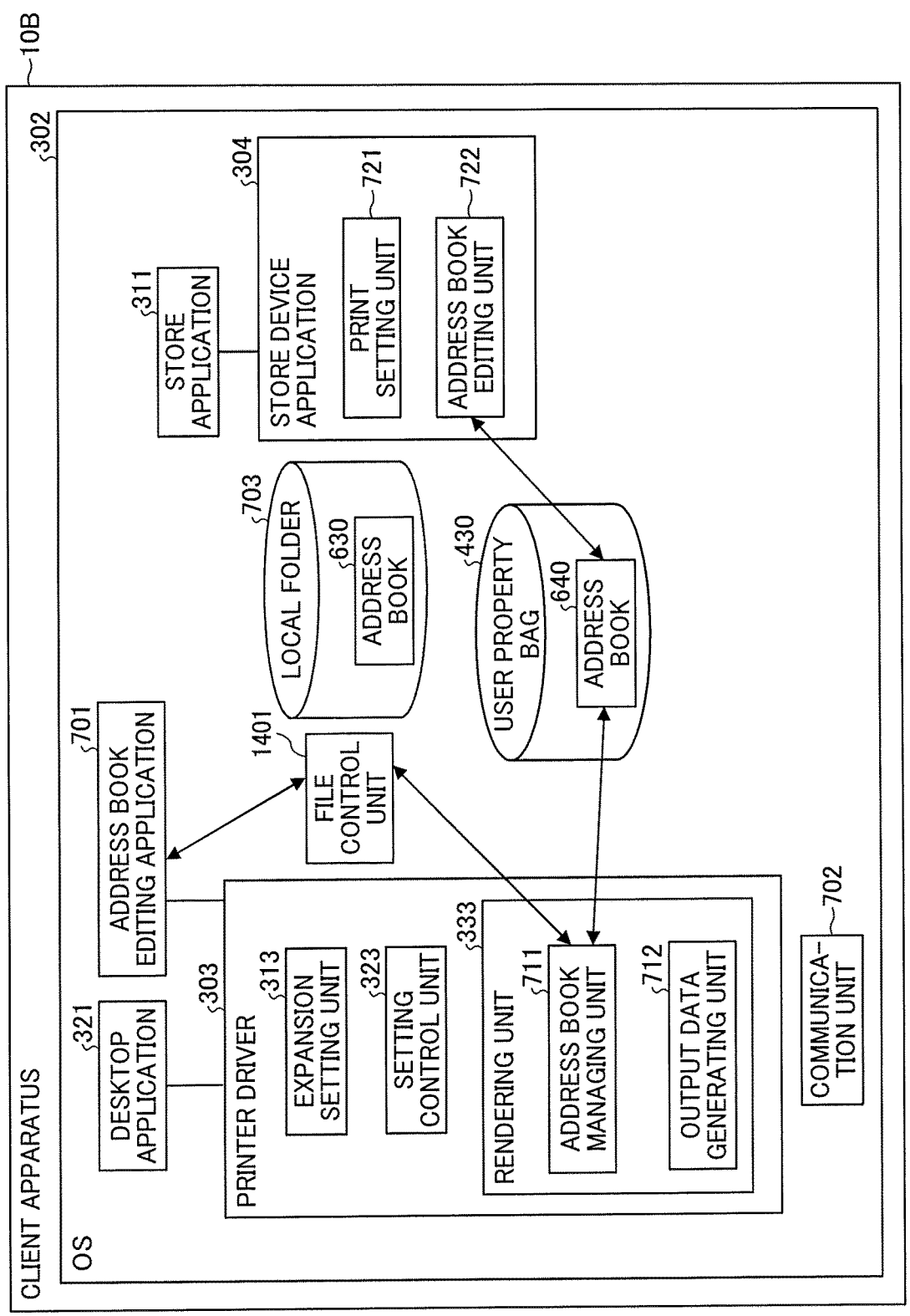
FIG. 14 is a diagram illustrating an exemplary functional configuration of a client apparatus according to a second embodiment of the present invention.

FIG. 14 is a diagram illustrating an exemplary functional configuration of a client apparatus according to the second embodiment. In FIG. 14, if the address book 630 stored in the local folder 703 is not an address book for an individual user but a shared address book shared by a plurality of users, contention for writing to the address book 630 may occur.

To prevent such contention for writing, a client apparatus 10B according to the second embodiment includes a file control unit 1401, as illustrated in FIG. 14.

The file control unit 1401 is implemented by a resident application executed by the CPU 106 in FIG. 2, for example. Further, one file control unit 1401 is provided to one client apparatus 10B. When editing and storing the address book 630, the address book editing application 701 and the address book managing unit 711 edit and store the address book 630 via the file control unit 1401.

If the file control unit 1401 receives requests for editing and storing the address book 630 from a plurality of address book managing units 711 (i.e., a plurality of users), the file control unit 1401 sequentially executes writing operations to the address book 630 in the order of receipt of the requests.

A processing procedure of an information processing method according to the second embodiment will now be described.

FIG. 15 is a sequence diagram illustrating an exemplary process of the information processing system 1 according to the second embodiment. FIG. 15 illustrates an example of a printing process performed when the user specifies the address by using the address book via the store application 311, to thereby transmit the output data to the transmission destination device 800, such as the image forming apparatus 20, the server 30, the cloud service 601, or the smart device 602. The present process is basically similar to the first process of the information processing system 1 of the first embodiment illustrated in FIG. 8. The following description will therefore focus on differences of the process of the second embodiment from the process of the first embodiment.

At step S1501, a process of editing the address book 640 similar to the processes of steps S801 to S804 in FIG. 8, for example, is performed.

At step S1502, with the stored address book (i.e., the address book 640), the user performs a transmission destination specifying operation of specifying the transmission destination device 800 on the print setting screen provided by the store device application 304.

At step S1503, the user performs a printing operation via the store application 311.

At steps S1504 and S1505, the store application 311 transmits a print request to the rendering unit 333 of the printer driver 303 via the OS 302 to request printing.

At step S1506, the output data generating unit 712 of the rendering unit 333 generates output data in a predetermined format from the output target data in accordance with the print setting information included in the print request.

When transmitting the output data to the transmission destination device 800 (e.g., an external apparatus), the output data generating unit 712 transmits the output data to the transmission destination device 800 in accordance with the information of the transmission destination included in the print request at step S1507.

When outputting a file to a destination in the client apparatus 10B, the output data generating unit 712 outputs the output data in the form of a file in accordance with the information of the transmission destination included in the print request at step S1508.

At step S1509, the address book managing unit 711 of the rendering unit 333 notifies the file control unit 1401 of the storage destination of the address book 630 in the local folder 703.

At step S1510, the file control unit 1401 refers to the storage destination of the address book 630 notified by the rendering unit 333.

When the address book 630 is newly created, the process of step S1511 is executed. At step S1511, the file control unit 1401 creates the address book 630 in the local folder 703.

At step S1512, the file control unit 1401 merges the address book 640 stored in the user property bag 430 and the address book 630 stored in the local folder 703 in accordance with a merging method similar to that described with FIGS. 10 to 11B, for example.

In the second embodiment, the file control unit 1401 thus functions as an address book managing unit that merges the address book 640 stored in the user property bag 430 and the address book 630 stored in the local folder 703.

Further, if the file control unit 1401 receives, from a plurality of request sources, request information items each representing a request for editing the address book 630 or a request for merging the address book 630 and the address book 640, the file control unit 1401 sequentially processes the request information items in the order of receipt thereof. The second embodiment, therefore, effectively prevents the contention for writing to the address book 630 stored in the local folder 703.

As described above, according to the foregoing embodiments, the address book stored in a storage device in the information processing apparatus is easily editable on the setting screen for the store application provided by the V4 printer driver.

The functional configuration of the client apparatus 10 illustrated in FIG. 7 and the functional configuration of the client apparatus 10B illustrated in FIG. 14 are illustrative. For example, the address book managing unit 711 illustrated in FIG. 7 may be included in the expansion setting unit 313. Similarly to the rendering unit 333, the expansion setting unit 313 is accessible to both the address book 630 stored in the local folder 703 and the address book 640 stored in the user property bag 430.

In this case, the address book managing unit 711 included in the expansion setting unit 313 may merge the address book 630 and the address book 640 when the user opens the address book 630 or the address book 640, for example.

In this case, the expansion setting unit 313 may display a merging method selection screen on the print setting screen, and merge the address book 630 and the address book 640 in accordance with a merging method selected on the merging method selection screen by the user.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above-described steps are not limited to the order disclosed herein.

The invention claimed is:

1. An information processing apparatus that executes a printer driver, the information processing apparatus comprising:
   processing circuitry configured to display a first setting screen and a second setting screen, the first setting screen being used to perform setting of the printer driver via a desktop application, and the second setting screen being used to perform setting of the printer driver via a store application; and
   one or more memories, the memories including
      a first memory area editable on the first setting screen and storing a first address book editable by the processing circuitry, and
      a second memory area editable on the second setting screen and storing a second address book editable by the processing circuitry,
   the processing circuitry being configured to merge the first address book and the second address book.

2. The information processing apparatus of claim 1, wherein based on setting information set on the first setting screen or the second setting screen, the processing circuitry generates output data in a certain format from data to be output, and
   wherein when generating the output data, the processing circuitry merges the first address book and the second address book.

3. The information processing apparatus of claim 2, wherein the processing circuitry outputs the output data to an output destination set on the first setting screen or the second setting screen.

4. The information processing apparatus of claim 2, wherein the processing circuitry executes the printer driver to display the first setting screen, manages the first address book and the second address book, and generates the output data.

5. The information processing apparatus of claim 1, wherein when the first address book or the second address book is opened by a user, the processing circuitry merges the first address book and the second address book in accordance with a merging method selected by the user.

6. The information processing apparatus of claim 1, wherein the processing circuitry merges the first address book and the second address book to make data content of the first address book and data content of the second address book equal to each other.

7. The information processing apparatus of claim 1, wherein the processing circuitry compares a storage time of first data included in the first address book and a storage time of second data included in the second address book, and updates data content of the first address book or the second address book with one of the first data and the second data that has a latest storage time.

8. The information processing apparatus of claim 1, wherein the second memory area includes a user property bag corresponding to the printer driver.

9. An information processing method performed by an information processing apparatus that executes a printer driver, the information processing method comprising:
   storing a first address book in a first memory area editable on a first setting screen that is used to perform setting of the printer driver via a desktop application;
   editing a second address book stored in a second memory area editable on a second setting screen that is used to perform setting of the printer driver via a store application; and
   merging the first address book and the second address book, respectively read from the first memory area and the second memory area.

10. A non-transitory recording medium storing a plurality of instructions which, when executed by one or more processors, cause the processors to perform an information processing method comprising:
   storing a first address book in a first memory area editable on a first setting screen that is used to perform setting of the printer driver via a desktop application;
   editing a second address book stored in a second memory area editable on a second setting screen that is used to perform setting of the printer driver via a store application; and
   merging the first address book and the second address book, respectively read from the first memory area and the second memory area.

11. The non-transitory recording medium of claim 10, wherein the information processing method further comprises:
   based on setting information set on the first setting screen or the second setting screen, generating output data in a certain format from data to be output, and
   wherein the generating includes the merging.

12. The non-transitory recording medium of claim 11, wherein the information processing method further comprises:
   outputting the output data to an output destination set on the first setting screen or the second setting screen.

13. The non-transitory recording medium of claim 11, wherein the information processing method further comprises:
   executing the printer driver to display the first setting screen;

managing the first address book and the second address book; and generating the output data.

14. The non-transitory recording medium of claim 10, wherein the merging includes merging the first address book and the second address book in accordance with a merging method selected by a user when the first address book or the second address book is opened by the user.

15. The non-transitory recording medium of claim 10, wherein the merging includes merging the first address book and the second address book to make data content of the first address book and data content of the second address book equal to each other.

16. The non-transitory recording medium of claim 10, wherein the information processing method further comprises:

comparing a storage time of first data included in the first address book and a storage time of second data included in the second address book; and updating data content of the first address book or the second address book with one of the first data and the second data that has a latest storage time.

17. The non-transitory recording medium of claim 10, wherein the second memory area includes a user property bag corresponding to the printer driver.

\* \* \* \* \*